Patented May 23, 1944

2,349,461

UNITED STATES PATENT OFFICE 2,349,461

MANUFACTURE OF AMINES

Henry Reginald Clive Pratt, Halewood, near Liverpool, and George Oswald Morris, Eccleston Lane Ends, near Prescot, England, assignors to Imperial Chemical Industries Limited, a corporation of Great Britain No Drawing. Application June 14, 1941, Serial No. 398,114. In Great Britain July 18, 1940

9 Claims. (Cl. 260—583)

This invention relates to the manufacture of amines and more particularly to the manufacture of secondary and tertiary amines.

It is already known to react mixtures of alcohols, aldehydes or ketones with hydrogen and ammonia in the presence of hydrogenation catalysts to obtain primary amines together with certain amounts of secondary and tertiary amines. It is also known to prepare mixtures of primary, secondary and tertiary amines by reducing alkyl cyanides with hydrogen in the presence of hydrogenating catalysts such as reduced nickel, but in this reaction the product is contaminated with ammonia which has to be separated from the amines, and results in a relatively poor conversion of the nitrogen to amino-nitrogen.

According to the present invention mixtures rich in secondary and/or tertiary amines are produced by reacting hydrogen at an elevated temperature and in the presence of a hydrogenating catalyst with a mixture containing a nitrile and an alcohol and/or an aldehyde and/or a ketone. Preferably an excess of hydrogen is used, that is such an amount that some passes through the reaction zone unchanged.

Suitable catalysts for use according to the invention include those elements of the 1st, 2nd, 6th, 7th and 8th groups of the periodic system which have a hydrogenating action, and compounds of those elements, in particular copper, iron, cobalt and nickel, either alone or in conjunction with each other. Substances which have a dehydrating and/or promoting action such as difficultly reducible oxides, may also be incorporated in the catalyst mass. Examples of these agents include oxides of thorium, silicon, aluminium, chromium and cerium. The catalysts may be supported in the usual manner, as for example on pumice, silica gel, bleaching earths, bauxite or kieselguhr.

Thus, one catalyst which has been found to be very suitable is reduced nickel or a mixture of reduced nickel and alumina supported on pumice. This may be prepared by a general method which consists of impregnating pumice with an aqueous solution of the nitrate of the metal and the nitrate of a metal having a difficultly reducible oxide, evaporating the water, calcining the impregnated material at a temperature not substantially exceeding 500° C., and then reducing the more easily reducible oxide, for example, nickel oxide by heating the calcined material in a stream of hydrogen at the same temperature for about 2 hours. Alternatively compounds of those catalytic metals together with, if desired, compounds of those metals having difficultly reducible oxides may be precipitated with solutions of carbonates or bicarbonates of ammonium or the alkali metals. The precipitates after washing may be incorporated with a support, calcined and reduced at a temperature not substantially exceeding 500° C. If required the catalyst so obtained may be pelleted.

The reaction may be carried out at atmospheric pressure or at greater or less pressures. The reaction temperature should not substantially exceed 400° C. and is probably maintained between 180° C. and 250° C.

Considerable variation in the proportion of the nitrile to the alcohol or its equivalent in the mixture is permissible, and it has also been found that by suitably varying the proportion of nitrile to aldehyde it is possible to make either the secondary amine or the tertiary amine the main product. Thus, using excess hydrogen in a reaction mixture containing also a nitrile and an aldehyde, it is found that for the optimum yield of secondary amine the molar ratio of the nitrile to aldehyde should be approximately 2:1, while when it is desired to produce mainly tertiary amines the molar ratio of nitrile to aldehyde should be less than 1:1 and preferably in the neighbourhood of 1:2.

If the nitrile and the aldehyde, ketone or alcohol are substitution products of different hydrocarbons, then, in general, mixed secondary or tertiary amines will result; i. e. amines of the type $R_1R_2NH$, $R_1R_2R_2N$ and $R_1R_1R_2N$, whereas if the nitrile and the aldehyde, alcohol or ketone are derived from the same hydrocarbon, the secondary and tertiary amines will be of the type $(R)_2NH$ and $(R)_3N$ respectively.

The invention is of particular value in the manufacture of the lower aliphatic amines, that is amines of the types $R_1R_2NH$ and $R_1R_2R_2N$ where $R_1$ and $R_2$ are ethyl, propyl, isopropyl, butyl or isobutyl radicles. Thus diethylamine and triethylamine may be prepared by reacting hydrogen with acetonitrile and acetaldehyde or a polymer thereof, for example paraldehyde, or with ethyl alcohol.

In one method of carrying out the invention which is applicable when the nitrile and aldehyde, alcohol or ketone are liquid, is to mix the two in the proportion in which they are to be reacted, and to deliver the mixture gradually, i. e. in a stream or a series of drops, on to the catalysts maintained at the reaction temperature and at the same time to introduce hydrogen into the reaction chamber so that the vapours of the liquid mixture and hydrogen are contacted simultaneously with the catalyst. Either pure hydrogen may be used, or gases containing hydrogen together with inert diluents, as for example nitrogen. Preferably an excess of hydrogen is used, i. e. such an amount that some leaves the reaction vessel unchanged.

The vapours leaving the reaction vessel are cooled to condense normally liquid products, while the hydrogen and any inert gaseous diluent can either be vented to the atmosphere or, if desired, recycled with further quantities of reactants. The condensed products can then be fractionated to isolate the required amine, while any unchanged reactants are returned to the reaction zone. Other methods of isolating the product may be employed; for example, the amines may be recovered from the reaction products by washing them with a dilute mineral acid, suitably sulphuric acid.

Suitable materials of construction are, for example, steel, copper, nickel, aluminium glass and ceramic material but it has been found preferable to use steel, owing to its durability.

The following examples illustrate but do not limit the invention, all parts being by weight:

Example 1

A mixture of 40 parts of acetonitrile and 60 parts of acetaldehyde, together with excess hydrogen, was passed over a nickel catalyst maintained at a temperature between 200° C. and 230° C. at the rate of 0.25 part per hour of the liquid reactants per part of catalyst. The reaction was conducted in a glass apparatus. The greater portion of the condensible constituents of the reaction product were recovered by cooling, and the remainder by absorption in dilute mineral acid. The whole of the liquids so obtained were then mixed and unchanged reactants were distilled off from the acid solution. Analysis of the solution thus obtained showed that its basic constituents were composed of 2% ammonia, 12% monoethylamine, 24% diethylamine and 62% triethylamine. It was calculated that 65% of the acetonitrile and 50% of the acetaldehyde had been converted to ethylamines. The amines were recovered by adding an excess of caustic soda to the solution and distilling off the bases until the temperature of the still-head was 96° C. The distillate was then dried over solid caustic soda, and fractionated. The fraction 53–58° C. consisted mainly of diethylamine.

The nickel catalyst referred to above was prepared by impregnating granular pumice with an aqueous solution of nickel nitrate until it had taken up half its weight of nickel nitrate, and drying it. It was then calcined and reduced in an atmosphere of hydrogen at 400° C.

Example 2

A mixture of 40 parts of acetonitrile and 60 parts of acetaldehyde together with excess hydrogen was passed over a nickel-aluminium oxide catalyst maintained at a temperature between 200° C. and 230° C. at a rate of 0.30 part per hour of the liquid reactants per part of catalyst. The reaction was conducted in a glass apparatus. The product was recovered and fractionated as in Example 1 and consisted of 28% diethylamine and 72% triethylamine. It was calculated that 60% of the acetonitrile and 67% of the acetaldehyde had been converted to these bodies.

The nickel-aluminium oxide catalyst was prepared by impregnating 140 parts of granular pumice with 70 parts of nickel nitrate and 90 parts of aluminium nitrate, calcining and reducing in hydrogen at 400° C.

Example 3

Mixtures of various proportions of acetonitrile and acetaldehyde together with an excess of hydrogen were reacted in a steel apparatus in the presence of a nickel-aluminium catalyst maintained between 210° C. and 215° C., by dropping a mixture of the two liquids into the reaction space containing the catalyst, at a rate of between 0.20 and 0.23 part per hour of the liquid reactants per part of catalyst, and simultaneously passing the hydrogen through the reaction vessel. The products were analysed and worked up as in Example 1 and the results obtained for the various mixtures were as follows:

| Composition of liquid reactant | | Hydrogen rate in parts per hour per part of catalyst | Composition of basic products | | | | Conversion of acetaldehyde to amine | Conversion of nitrile to amines |
|---|---|---|---|---|---|---|---|---|
| Acetaldehyde | Acetonitrile | | Ammonia | Monoethylamine | Diethylamine | Triethylamine | | |
| Per cent | Per cent | | Per cent | Per cent | Per cent | Per cent | Per cent | Per cent |
| 10 | 90 | 0.014 | 14.0 | 20.5 | 39.5 | 26.0 | 80 | 86 |
| 20 | 80 | 0.014 | 10.5 | 20.6 | 44.2 | 24.7 | 81 | 86 |
| 30 | 70 | 0.014 | 3.9 | 28.6 | 43.9 | 25.6 | 78 | 95 |
| 40 | 60 | 0.014 | 1.9 | 24.0 | 40.4 | 33.7 | 74 | 86 |
| 50 | 50 | 0.0125 | 1.5 | 3.0 | 32.0 | 63.0 | 61 | 51 |
| 60 | 40 | 0.012 | 1.8 | 9.0 | 21.6 | 67.6 | 70 | 60 |
| 67 | 33 | 0.01 | 1.2 | 6.6 | 18.9 | 73.3 | 98 | 72 |

The nickel-aluminium oxide catalyst was prepared by impregnating 120 parts of pumice with a solution containing 60 parts of nickel nitrate and 77 parts of aluminium nitrate, and heating until all the water was expelled. It was then calcined at a temperature of 400° C., transferred to a steel reaction tube, and reduced in a stream of hydrogen at 400° C.

Before carrying out the last run quoted in the above table, the catalyst was re-activated by heating to 400° C. to 450° C. in a current of air for 1½ hours, and reducing at the same temperature in a current of hydrogen for 2 hours.

Example 4

A mixture of 18.7 parts of n-butyronitrile and 31.3 parts of n-butyric aldehyde was passed together with excess hydrogen over a nickel-alumina-pumice catalyst prepared as described in Example 3, and maintained at 220–240° C. The reaction was carried out in a steel apparatus. The reaction products were absorbed in dilute sulphuric acid and the resulting solution was distilled until all neutral products were removed. About 7.5 parts of organic liquid, mainly butyl alcohol, were removed from the distillate by salting out with potassium carbonate. The liquid in the distilling flask was cooled and made alkaline with caustic soda. The lower layer which formed was run off and the upper layer was dried over solid caustic soda and fractionated. The following fractions were collected:

| | Parts |
|---|---|
| Fraction 1, 125–212° C | 5.2 |
| Fraction 2, 212–218° C | 20.8 |
| Residue | 3.2 |

No ammonia or monobutylamine was present in the upper layer. Fraction 1 consisted mainly of a mixture of dibutylamine and tributylamine, while fraction 2 consisted mainly of almost pure tributylamine.

Example 5

A mixture of 45 parts of acetonitrile and 105 parts of acetone was passed together with excess hydrogen over a catalyst prepared as described in Example 3, and maintained at 215–225° C. The reaction was conducted in a steel apparatus. The product was absorbed in dilute sulphuric acid, and the neutral bodies were removed by distillation. The residual liquor was cooled and made strongly alkaline with caustic soda. The lower layer was removed and distilled until the temperature of the still-head reached 98° C., and the distillate was added to the upper layer which was dried over solid sodium hydroxide and fractionated. Ammonia and some monoethylamine were lost in these operations. The following fractions were collected:

| | Parts |
|---|---|
| 1. 25° C.–80° C | 33.6 |
| 2. 80° C.–95° C | 8.8 |
| 3. 95° C.–140° C | 19.2 |
| Residue | 4.0 |

The first fraction was a mixture of ethylamines together with some isopropylamine, the second fraction was a mixture of triethylamine with di-ethylisopropylamine and some water, while the third was a mixture of diethylisopropylamine with di-isopropylethyl-amine.

Example 6

The process of Example 1 was repeated in a glass reactor using a catalyst which consisted of a mixture of copper, nickel and alumina supported on pumice. The composition of the product after the removal of unchanged reactants was found to be 3.9% of ammonia, 5.9% of monoethylamine, 26.4% of diethylamine and 63.8% of triethylamine and the amount of product represented a conversion of 68% of acetaldehyde and 92% of acetonitrile.

The nickel-copper-alumina catalyst was prepared by impregnating 140 parts of granular pumice with a solution containing 35 parts, 37 parts and 90 parts of the hydrated nitrates of nickel, copper, and aluminium respectively and drying, calcining at 380° C. for 2 hours and reducing the material so produced with hydrogen at a temperature of 320° C. for 2 hours.

Example 7

The process of Example 6 was repeated, using a steel reactor when the composition of the product after removal of unchanged reactants was found to be 1% of ammonia, 8% monoethylamine, 37% diethylamine and 54% triethylamine, while the amount of product represented a conversion of 75% of the acetaldehyde and 88% of the acetonitrile.

We claim:

1. The process for the manufacture of lower aliphatic amines having at least two carbon atoms attached to the nitrogen atom, which comprises reacting hydrogen with a mixture of a lower aliphatic nitrile and at least one lower aliphatic aldehyde, the molar ratio of nitrile to aldehyde being not more than about 2:1, and said reaction being carried out in the presence of a hydrogenating catalyst at a temperature within the range of 180° C. to 400° C.

2. The process for the manufacture of tertiary lower aliphatic amines, which comprises reacting hydrogen with a mixture of a lower aliphatic nitrile and at least one lower aliphatic aldehyde, the molar ratio of nitrile to aldehyde being less than 1:1, and said reaction being effected in the presence of a hydrogenating catalyst at a temperature within the range of 180° C. to 400° C.

3. The process for the manufacture of tertiary amines having the molecular formula $R_3N$, in which R is a lower aliphatic hydrocarbon radical, which comprises reacting hydrogen with a mixture of a lower aliphatic nitrile and a lower aliphatic aldehyde derived from the same hydrocarbon as the nitrile, the molar ratio of nitrile to aldehyde being less than 1:1, and said reaction being effected in the presence of a hydrogenating catalyst at a temperature within the range of 180° C. to 400° C.

4. The process in accordance with claim 1 characterized in that the molar ratio of nitrile to aldehyde is within the range of from about 2:1 to about 1:2.

5. The process in accordance with claim 1 characterized in that the hydrogenating catalyst is selected from the group consisting of copper, iron, cobalt and nickel.

6. The process in accordance with claim 1 characterized in that the hydrogenating catalyst has incorporated therein a compound selected from the group consisting of the oxides of the metals thorium, silicon, aluminum, chromium and cerium.

7. The process in accordance with claim 1 characterized in that the reaction is carried out in the presence of an excess of hydrogen.

8. The process in accordance with claim 1 characterized in that the molar ratio of nitrile to aldehyde is about 1:2.

9. The process for the production of triethyl amine, which comprises reacting hydrogen with a mixture of acetonitrile and acetaldehyde, the molar ratio of acetonitrile to acetaldehyde being between 1:1 and about 1:2, and said reaction being effected in the presence of a nickel catalyst at a temperature within the range of 180° to 250° C.

HENRY REGINALD CLIVE PRATT.
GEORGE OSWALD MORRIS.

CERTIFICATE OF CORRECTION.

Patent No. 2,349,461. May 23, 1944.

HENRY REGINALD CLIVE PRATT, ET AL.

It is hereby certified that error appears in the printed specification of the above numbered patent requiring correction as follows: Page 2, first column, line 49, Example 1, for "0.25" read --0.26--; page 3, second column, line 54, claim 8, for the claim reference numeral "1" read --3--; and that the said Letters Patent should be read with this correction therein that the same may conform to the record of the case in the Patent Office.

Signed and sealed this 25th day of July, A. D. 1944.

(Seal)

Leslie Frazer
Acting Commissioner of Patents.